Dec. 30, 1930.  M. J. LURIE ET AL  1,787,009
SALT DRIER
Filed Dec. 19, 1929   5 Sheets-Sheet 3

MICHAIL J. LURIE
ANATOLY P. WOROSHILOW
INVENTORS

BY John P. Nikonov
ATTORNEY

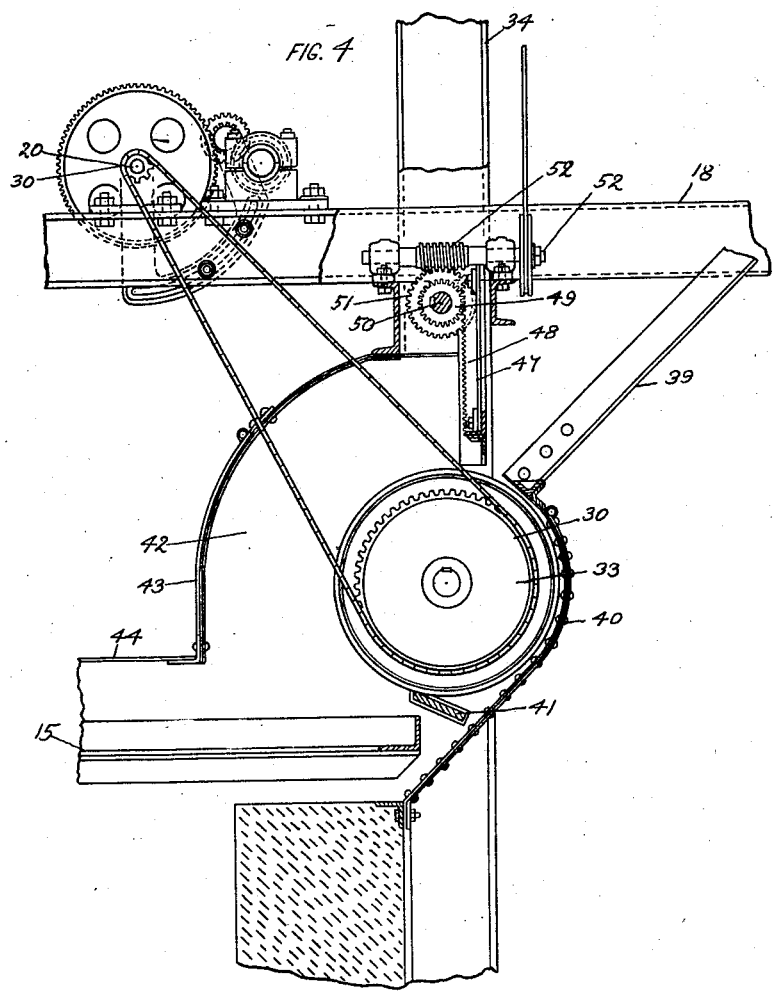

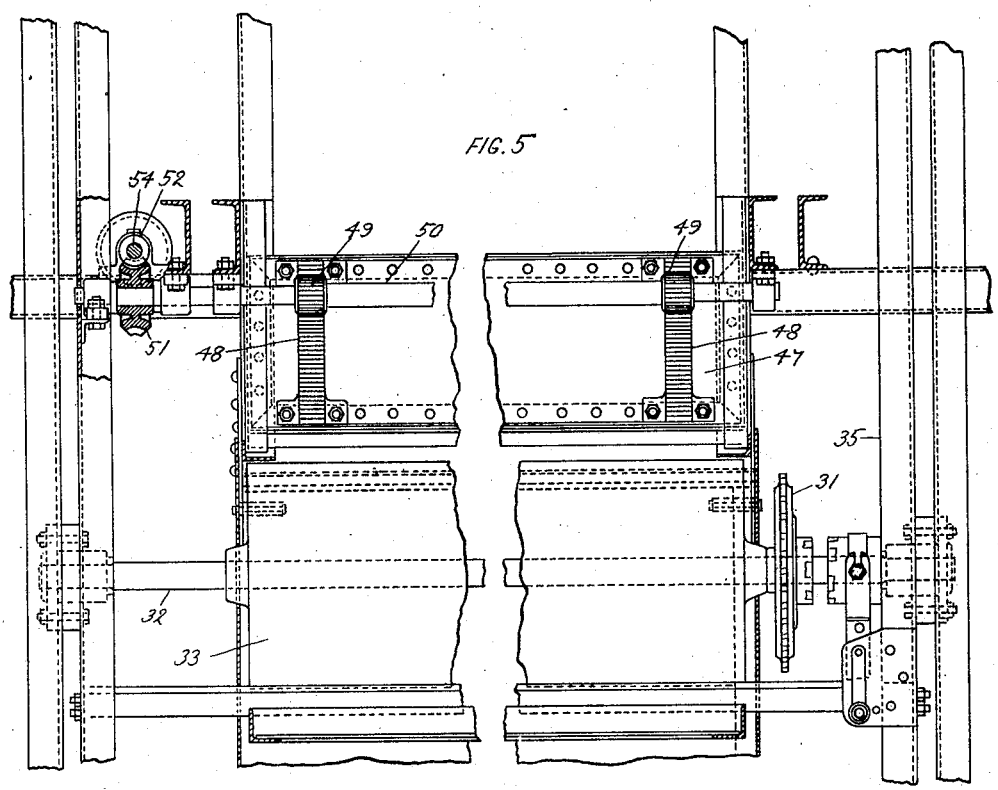

Patented Dec. 30, 1930

1,787,009

UNITED STATES PATENT OFFICE

MICHAIL J. LURIE AND ANATOLY P. WOROSHILOW, OF MOSCOW, UNION OF SOCIALIST SOVIET REPUBLICS

SALT DRIER

Application filed December 19, 1929, Serial No. 415,236, and in Union of Socialist Soviet Republics March 10, 1928.

Our invention relates to driers and has a particular reference to driers in which powdered or granulated material is subjected to a direct action of hot gases.

The object of our invention is to provide a drier in which finely divided particles of a material, crystals, etc., can be dried by bringing each particle, equally on all its sides, in contact with heated gases so as to obtain a uniform degree of dryness for all such particles.

In ordinary driers the material is usually handled in bulk, on conveyors, in baskets, on trays, etc., so that the upper layers lose considerably more moisture than the layers hidden underneath.

In order to obtain a uniform drying we provide a drying chamber through which hot gases or heated air are circulated. Into this drying zone the material is dropped from a sieve or a similar device in the form of a loosened stream. Each particle of this material, being free and separated from the others, comes in contact on all sides with the hot gases and rapidly loses its moisture. The conditions being exactly identical for all the individual particles, the degree of dryness is also obtained exactly uniform.

Our invention is more fully described in the accompanying specification and drawings in which—

Figure 1:
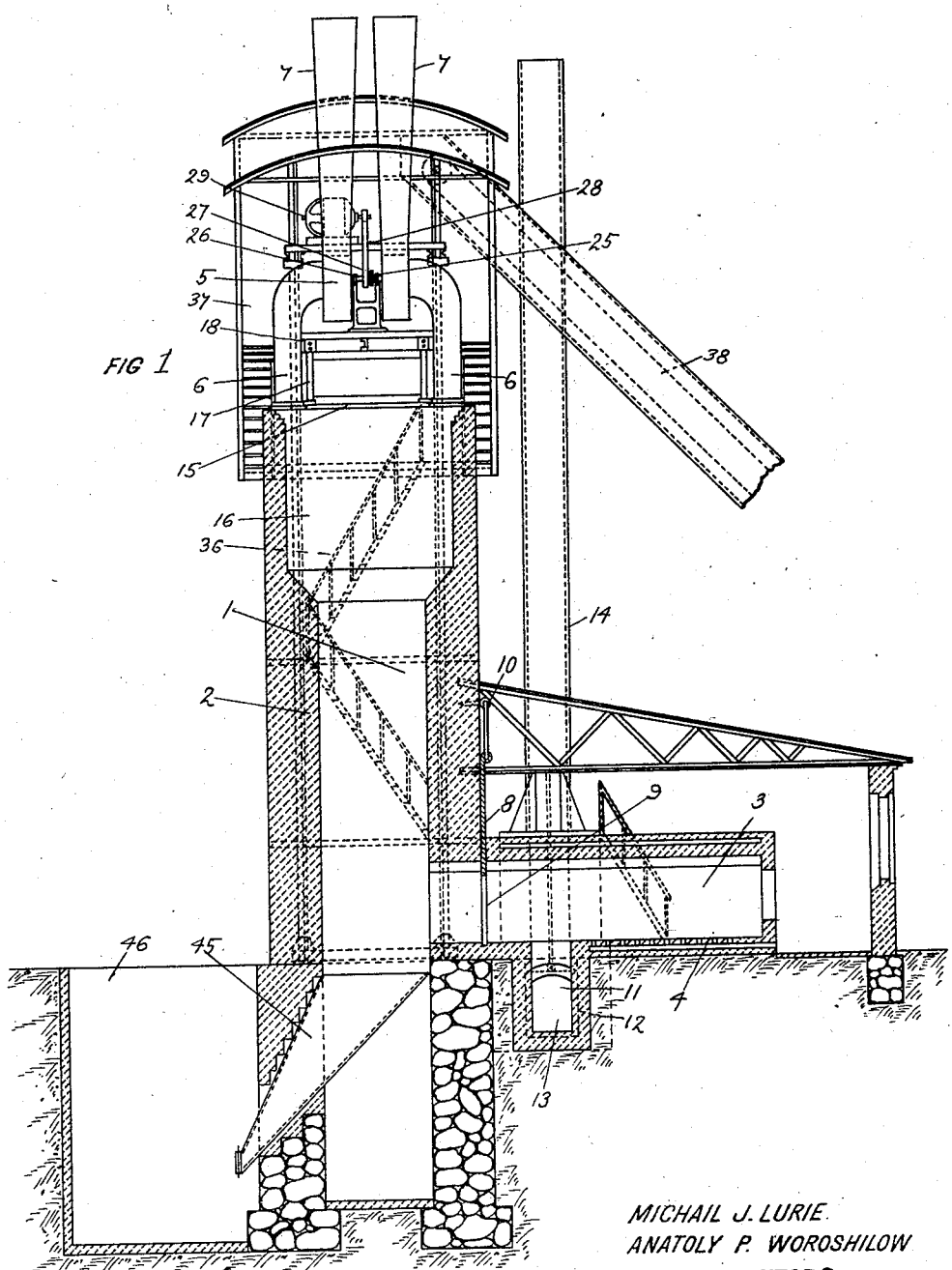
Figure 2:
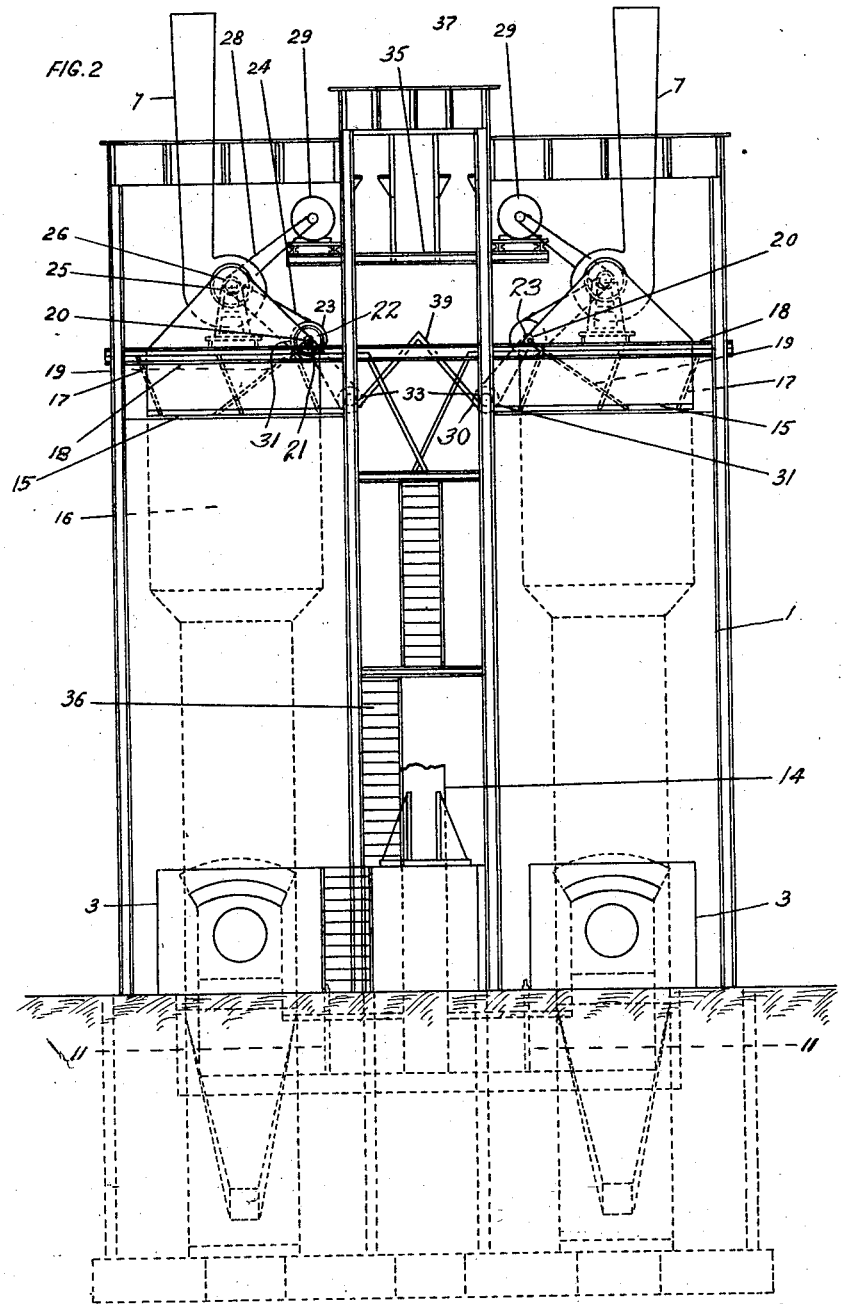
Figure 3:
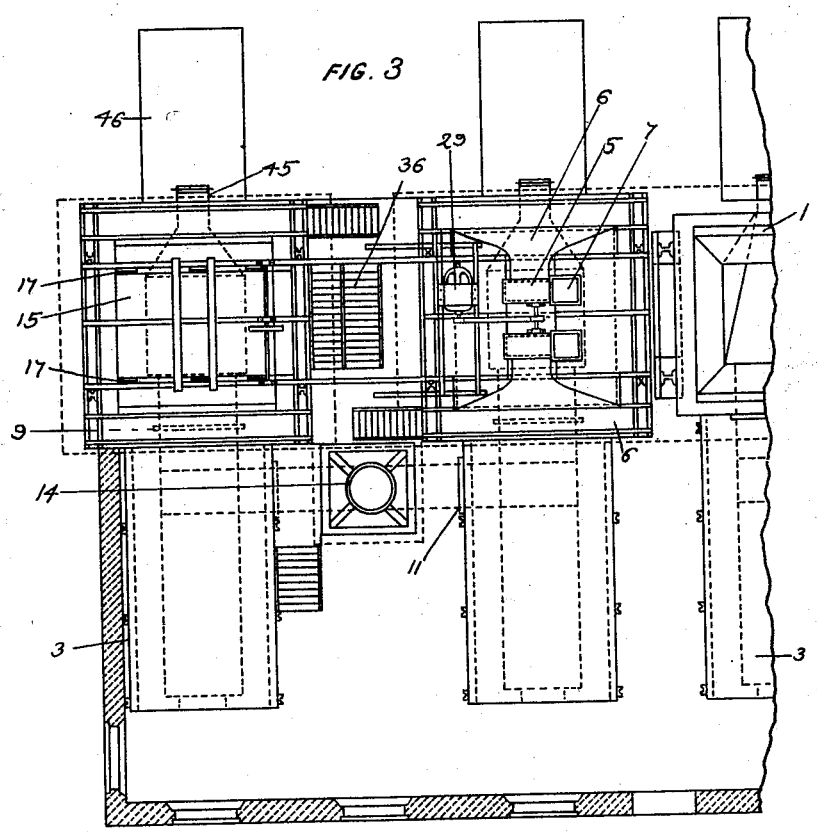

Fig. 1 is a sectional elevation of our drier, Fig. 2 is a side view of same, Fig. 3 is a plan view, Fig. 4 is a detailed view of a feeding mechanism, and Fig. 5 is a side view of same.

Our drier consists of a vertical drying chamber 1 with walls made of heat insulating material and with a refractory lining 2 inside. It may be of any convenient height, although we found that good results are obtained when it is made from 10 to 15 meters high.

The fuel is burned in a furnace 3 on a grate 4 and the hot gases pass through the drying chamber being sucked up by fans 5 through their intake pipes 6 and blown into the atmosphere through the exhaust pipes 7.

A shutter 8 is placed in a slot 9 suspended on a chain or similar flexible carrier 10. By lowering this shutter the passage from the furnace to the drying chamber can be closed.

Another shutter 11 slides in a slot 12 in a flue 13 connected with a smoke stack 14.

A shaker screen 15 is placed on top of the drier of approximately the same width as the main shaft of the drier (see Fig. 1) and about of the same length as the enlarged upper portion 16 of the drier. The intake pipes 6 are enlarged at the bottom covering the full length of the enlarged top portion of the drier (Fig. 2) and covering the space between the sides of the screen and the walls of the chamber 16 (Fig. 1).

The shaker screen is suspended on hinged or resilient bars 17 from beams 18 forming part of the framework of the drier. An inclined rod 19 connects the shaker with a countershaft 20 by means of an excentric 21 engaged by a yoke 22 on the end of the rod 19.

The countershaft 20 has a pulley 23 connected by a belt 24 with a pulley 25 on a shaft 26 coupled with fan impellers. A second pulley 27 on the fan shaft is connected by a belt 28 with a motor 29.

The countershaft 20 has also a pulley 30 belted to a pulley 31 on a shaft 32 on which a rotary feeder 33 is mounted. All these shafts are supported in bearings in beams 34 and 35, forming a part of the drier framework.

The drier chambers 1 are arranged in pairs side by side with a stairway 36 between them and a bin 37 in the upper portion. The material to be dried is delivered to the bin by an inclined conveyor or elevator 38 which may be of any suitable type, such as a bucket or scraper elevator.

The bottom of the bin is formed of two inclined plates 39 leading to a housing 40 of the feeder 33. The housing underneath extends to the wall of the chamber 1. A scraper 41 is provided for removing the material from the surface of the feeder.

A circular passage 42 is formed around the feeder by a curved plate 43 extending from the bin to a cover plate 44 supported at a certain height above the screen 15.

An inclined spout 45 extends from the bottom of the drier to an unloading chamber 46. A suitable conveyor (not shown) or other arrangement can be provided in the pit 46 for a continuous removal of the dried material. The bins 37 are separated from the feeder passages 42 by vertical gates 47 which come against the surfaces of the feeder cylinders 33. These gates are slidably fitted between the extensions of the beams 34. Racks 48 are fastened to the gates and are in mesh with pinions 49 mounted on a horizontal shaft 50. This shaft is rotatively supported in bearings mounted on the beams 34 and has a worm gear 51 in mesh with a worm 52 on a shaft 54 operated by a motor 29 through a suitable transmission.

The operation of our drier is as follows.

The material to be dried is delivered by the elevator 38 (or by some other suitable appliance) to the bin 37 where it is kept until the drier is ready for operation.

When the fire is started in the furnace 3, the shutter 8 is lowered closing the passage for the gases into the drier, and the shutter 11 is opened, so that the gases flow into the stack 14. This is necessary in order to prevent the first smoke and soot from getting in the drier. After the furnace operation becomes normal with a smokeless combustion, the shutter 11 is closed and the shutter 8 opened thereby admitting the hot products of combustion to pass into the chamber 1 where they rise to the top and are drawn away by the fans 5 from both sides of the shaker screens 15.

The gates 47 are then raised admitting the material from the bin 37 to the feeders 33 which deliver it on the screens 15.

The material from the shaker screen is dropped into the chamber 1 the individual particles being separated by the action of the screen. In passing through the drier in opposition to the rising current of hot gases, the particles thoroughly and uniformly come in contact on all sides with the hot gases thereby losing their moisture.

The dried material collects at the bottom of the chamber 1 in the spout 45 from which it passes on suitable conveyors or on unloading cars.

Our drier is especially suitable for drying chemicals in the form of crystals, and, especially, common salt or sodium chloride with crystals of larger sizes, up to 15–20 millimeters, already washed, such as salt from salt lakes, received from flotation processes, etc.

The salt rapidly loses its moisture and, with the temperature of products of combustion reaching 1000–1100 degrees centigrade, it is easy to obtain about ½% final moisture content with 4% initial moisture.

The capacity of one shaft represents about 60 tons per hour of the wet salt.

The motors operating unloading conveyor are interconnected with the motors 29, and with the arrangement of shafts and belts described, the stoppage of one of the motors will stop the operation of the other mechanisms, so that there will not be danger of overloading conveyors or operating shakers if the fans are stopped.

Important advantages of our drier are that the material becomes thoroughly and uniformly dried, also that the drying process is very rapid, so that the material does not remain for a sufficiently long time in the heated zone to become damaged. Due to the cleanliness of hot gases, as the preliminary smoky products of combustion are conducted away in a smoke stack, the drier is clean inside, so that it can be used for drying food articles. Due to the rapid and efficient drying process, the drier is comparatively small for its capacity. Its first cost is low, being only about one-fifth or one-eighth of the cost of driers of a conveyor type. The efficiency is high on account of high temperatures used, the power consumption is low, the operation is very simple. It does not require an expensive boiler room and has no metal parts inside subject to corrosion and interfering with the operation.

We claim as our invention:

In a drier, the combination with a vertical chamber, of means to deliver hot gases into said chamber from the bottom, an enlarged portion on top of said chamber, a flat screen in said enlarged portion, fans above said screen, intake pipes extending into said enlarged portion on both sides of said screen, said fans being adapted to exhaust said hot gases from said chamber, a bin on top of said drier, a feeder between said bin and said screen, and means to control the admittance of the material to be dried from said bin to said feeder.

In testimony whereof we affix our signatures.

MICHAIL J. LURIE.
ANATOLY P. WOROSHILOW.